US007818830B2

(12) United States Patent
Thorne et al.

(10) Patent No.: US 7,818,830 B2
(45) Date of Patent: Oct. 26, 2010

(54) SAFETY BATH SPOUT COVER AND SAFETY BATH SPOUT

(75) Inventors: Henry F. Thorne, West View, PA (US); Robert D. Daley, Pittsburgh, PA (US)

(73) Assignee: Thorley Industries, LLC, Pittsburgh, PA (US)

( * ) Notice: Subject to any disclaimer, the term of this patent is extended or adjusted under 35 U.S.C. 154(b) by 1095 days.

(21) Appl. No.: 11/461,134

(22) Filed: Jul. 31, 2006

(65) Prior Publication Data

US 2007/0022529 A1 Feb. 1, 2007

Related U.S. Application Data

(60) Provisional application No. 60/703,708, filed on Jul. 29, 2005.

(51) Int. Cl.
*E03C 1/04* (2006.01)
(52) U.S. Cl. .............................. 4/675; 4/661
(58) Field of Classification Search ............... 4/661, 4/675–678; 239/211, 288.5
See application file for complete search history.

(56) References Cited

U.S. PATENT DOCUMENTS

| 4,281,543 | A |   | 8/1981  | Raz                     |
|-----------|---|---|---------|-------------------------|
| 4,353,139 | A |   | 10/1982 | Wainwright et al.       |
| 4,432,635 | A |   | 2/1984  | Mayer                   |
| 4,630,940 | A | * | 12/1986 | Ostertag et al. ... 73/198 |
| 4,994,792 | A |   | 2/1991  | Ziegler, Jr.            |
| 5,076,709 | A | * | 12/1991 | Tognotti ............ 4/605 |
| 5,125,577 | A | * | 6/1992  | Frankel .......... 239/211 |
| 5,160,197 | A | * | 11/1992 | Klose ............... 4/605 |
| 5,172,860 | A |   | 12/1992 | Yuch                    |
| 5,199,790 | A | * | 4/1993  | Pawelzik et al. .... 374/147 |
| D354,550  | S | * | 1/1995  | Munoz ........... D23/256 |
| 5,482,078 | A | * | 1/1996  | Yeh ................. 4/661 |
| 5,535,779 | A |   | 7/1996  | Huang                   |
| 5,812,060 | A | * | 9/1998  | DeSpain et al. ..... 340/618 |
| 5,894,611 | A | * | 4/1999  | Toro ............... 4/661 |
| 6,000,845 | A |   | 12/1999 | Tymkewicz et al.        |
| 6,028,509 | A |   | 2/2000  | Rice                    |
| 6,126,313 | A |   | 10/2000 | Schiller                |
| 6,158,227 | A |   | 12/2000 | Seeley                  |
| 6,205,598 | B1| * | 3/2001  | Black et al. .......... 4/580 |
| 6,314,807 | B1|   | 11/2001 | Kawai et al.            |
| 6,427,260 | B1|   | 8/2002  | Osborne-Kirby           |
| D465,009  | S | * | 10/2002 | Siefken .......... D23/249 |
| 6,519,790 | B2|   | 2/2003  | Ko                      |
| 6,805,458 | B2|   | 10/2004 | Schindler et al.        |

(Continued)

*Primary Examiner*—Khoa D Huynh
(74) *Attorney, Agent, or Firm*—The Webb Law Firm (57) ABSTRACT

A safety bathtub spout cover includes a soft exterior spout receiving hollow body. A temperature sensor mechanism is positioned within the water flow within the hollow body. The temperature sensor mechanism is coupled to a temperature display and an audible temperature alarm on the hollow body to signal unsafe temperature conditions sensed by the temperature sensor mechanism. A child-proof manual override may be provided for disengaging the audible alarm. The body may further include a closing mechanism for attaching the spout cover to the faucet in a temporary, non-marring, non-residue attachment manner. The audible alarm may be a progressive audible temperature alarm with varied levels of activation corresponding to the severity of the scald condition sensed. The display is mounted in a manner visible from any viewing height above the faucet. The spout cover features may be incorporated directly into a safety spout.

17 Claims, 4 Drawing Sheets

U.S. PATENT DOCUMENTS

| | | |
|---|---|---|
| 6,871,540 B2 | 3/2005 | Barlian et al. |
| 6,892,745 B2 | 5/2005 | Benson |
| 6,892,807 B2 | 5/2005 | Fristedt et al. |
| 6,892,952 B2 | 5/2005 | Chang et al. |
| 7,000,850 B2 * | 2/2006 | Lin ............................ 236/94 |
| 7,553,076 B2 * | 6/2009 | An ............................ 374/148 |
| 7,588,197 B2 * | 9/2009 | Finell ........................ 239/211 |
| 2002/0002739 A1 | 1/2002 | Demonet |
| 2003/0086474 A1 | 5/2003 | Hammarth et al. |
| 2003/0125842 A1 | 7/2003 | Chang et al. |
| 2003/0131408 A1 * | 7/2003 | Choi ............................ 4/661 |
| 2003/0156620 A1 | 8/2003 | Wang |
| 2003/0202558 A1 | 10/2003 | Chung et al. |
| 2006/0045167 A1 | 3/2006 | Pawlenko et al. |
| 2006/0118645 A1 | 6/2006 | An et al. |
| 2006/0227847 A1 | 10/2006 | Johnson |
| 2006/0227850 A1 | 10/2006 | Johnson |
| 2006/0291535 A1 | 12/2006 | Craig et al. |

\* cited by examiner

SAFETY BATH SPOUT COVER AND SAFETY BATH SPOUT

RELATED APPLICATION

The present application claims the benefit of provisional patent application Ser. No. 60/703,708 entitled "Safety Bath Spout Cover and Safety Bath Spout" filed Jul. 29, 2005.

BACKGROUND INFORMATION

1. Field of the Invention

The present invention relates to safety products for a bathtub water dispensing spout. More particularly the present invention is directed to a bathtub water spout cover typically designed to prevent impact injuries among children and elderly associated with bumping against the hard metal spouts common in bathtubs.

2. Background Information

The bathroom represents an area of the home having a relatively higher risk of injury and, consequently many products have been designed to help minimize these risks. For example, existing bathtub water spout covers typically designed to prevent impact injuries among user's, such as children, disabled and elderly, associated with bumping against the hard metal spouts or faucets common in bathtubs. The existing spout covers are simply soft plastic sleeves that slide over the existing spout and have an opening that generally aligns with the spout opening. The existing spout covers are often in child friendly shapes, such as the form of a whale. The existing commercially viable spout covers essentially offer little more than impact resistance, when they are left in place, and a child friendly shape (the child friendly configuration can inhibit the safety functions by enticing the child to pull off the spout cover to play with in the bathtub).

The commercially available spout covers lose their effectiveness for impact resistance if they are removed by the child. Consequently, a more secure attachment would be beneficial. However, consumers prefer to be able to remove a protective cover at some point without significant difficulty. Consequently, any child proof attachment solution must be temporary and must also be cost effective. The cost effective aspect is critical to all aspects incorporated into a safety bath spout cover. Although consumers appreciate the risks associated with existing bath spouts for young children, these risks will be readily incurred by the consumers if the price of the associated bath spout cover is too high, and a bath spout cover that stays on the store shelf has absolutely no safety benefit.

Another safety concern with bathing small children is the danger of scalding the child with bath water that is too hot for young children. The danger of scalding is also present for other bath users, but children are more susceptible to this injury because their skin is thinner and they are more likely to make a user error when unaccompanied by an adult. Water temperature that is acceptable, even preferable to some adults, is dangerous to young children. Incorporating elements into a bath spout safety cover that addresses these safety issues will greatly increase the utility of the spout cover and the relative safety of the users. Again, any technological solution to this issue incorporated into a bath spout cover must be a cost effective solution for commercial acceptance.

Other issues to be addressed in bath spout designs are universal acceptance to the largest variety of commercially available bath spouts; minimizing germs, mold, mildew and other bacterial growth in what is commonly a warm wet environment that is very conducive for such growths; and providing easy attachment and removal by adults. Finally it needs to be stressed that any technological solution to these issues that are incorporated into a bath spout cover must be cost effective solutions, or they will not be used at all.

It is the objects of the present invention to address the deficiencies of the prior art bath spout covers discussed above and to do so in an efficient cost effective manner.

SUMMARY OF THE INVENTION

It is noted that, as used in this specification and the appended claims, the singular forms "a," "an," and "the" include plural referents unless expressly and unequivocally limited to one referent.

For the purposes of this specification, unless otherwise indicated, all numbers expressing quantities of ingredients, reaction conditions, and other parameters used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

All numerical ranges herein include all numerical values and ranges of all numerical values within the recited numerical ranges. Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

The various embodiments and examples of the present invention as presented herein are understood to be illustrative of the present invention and not restrictive thereof and are non-limiting with respect to the scope of the invention.

According to one embodiment of the present invention addressing at least one of the above stated objects, a safety bathtub spout cover includes a hollow body having a soft exterior and adapted to receive the spout or faucet for a tub therein. Within the meaning of this application the terms "spout" and "faucet" interchangeably refer to a bathtub water dispensing plumbing fixture generally extending from the wall essentially at the top surface of the bathtub. The terms are not intended to encompass sink faucets or shower heads, which do not present similar safety concerns. The term "soft exterior" within the meaning of this application refers to an impact resistant material that is softer than conventional metal or hard plastic, such as measured by a Rockwell Hardness test, and will be understood by those in the child proofing art. A wide variety of materials can be used to form the soft exterior, including rubber, soft plastics (low durometer plastics), foams and the like.

The hollow body may include a water guide formed therein, the water guide having a water inlet adapted to receive water from an outlet of the faucet and terminating in a water outlet for the spout cover. The water inlet may be a funnel shape to accommodate inaccuracy in placement by the user as well as variation in the spout outlets between distinct models of faucets. The water guide may further include an offset in the flow path to provide an area in the water guide where water is certain to be present when water is flowing from the faucet either at high flow rates or reduced rates associated with the play of a child including a slow drizzle.

A temperature sensor mechanism may be positioned within the water flow within the hollow body. The temperature sensor mechanism may be placed within the water flow through positioning the temperature sensor mechanism within the water guide of the hollow body in a position offset in plan view from the water inlet. Alternatively, the temperature sensor mechanism may be placed within the water flow through forming of the temperature sensor mechanism as an array of sensors that extend across the water guide.

The temperature sensor mechanism may be coupled to a temperature display on the hollow body for displaying the temperature of the water sensed by temperature sensor mechanism and/or a temperature alarm on the hollow body comprising at least one of an audible alarm and a visual alarm, wherein the temperature alarm is configured to signal unsafe temperature conditions sensed by the temperature sensor mechanism. The temperature sensor mechanism and the temperature display should form a rapid response system, wherein the display is a digital display and the sensor and display have a thermal time constant of less than 5 seconds between a measured temperature and the display of the temperature, preferably less than 3 seconds. The term "thermal time constant" is defined as the time for the sensor to detect 63% of the temperature change and is an industry standard for response time. The thermal response time is technically a measure of the sensor response alone, but here will include the display lag, which is inconsequential. The temperature alarm should also have a relatively rapid response time, as children can be burned in a very short amount of time.

In one embodiment of the present invention the spout cover includes a closing mechanism for attaching the spout cover to the faucet in a temporary, non-marring, non-residue attachment manner. The closing member may be a releasable band buckle, such as found in ski boots and roller blades, an encircling strap and buckle, as common in backpacks, or overlaying hook and loop type fasteners. The body may include a slit on an end receiving the faucet, and an interior faucet facing surface of a high friction material (e.g. a soft rubber band) to assist in forming the attachment mechanism.

One embodiment of the safety bathtub spout cover according to the present invention may include the audible alarm, wherein the audible alarm is a progressive audible temperature alarm with varied levels of activation corresponding to the severity of the scald condition sensed. Essentially as the sensed condition becomes more dangerous the audible alarm increases in volume, or pitch, or frequency or some other attribute. Further, the display may include a visual, non-numeric display of the sensed temperature. For example the display may be a display with back lighting of distinct colors. For example a blue back lighting would indicate a cool or cold water temperature (relative to taking children taking baths), a white or normal back lighting would indicate a normal temperature range, and a red back lighting would indicate a dangerous condition. The back lighting provides an independent non-numeric display for rapidly conveying the sensed condition. The non-numeric display may certainly be coupled with a conventional numeric display (e.g. the back lighting of the display will back light a numeric display).

The safety bathtub spout cover according to another aspect of the present invention wherein the display is mounted in a direction facing the tub and at an angle of at least five degrees relative to vertical, whereby the display is visible from any viewing height above the faucet. This allows the parent to view the water condition while standing beside the tub or kneeling while bathing their child. This feature can be beneficial for elderly patients who can see the water temperature indication from a standing position prior to stepping into the tub.

Another aspect of the present invention includes a manual override for disengaging the audible alarm, and wherein the actuation of the manual override is child-proof. This allows adults, e.g. the parents, to take a hot bath that may be at a temperature that would be considered dangerous for children, without hearing the audible alarm which would be distracting and counter productive to the purpose of the relaxing hot bath. The override mechanism should be child-proof so small children could not inadvertently disengage this safety feature. Without the manual override the users would need to take off the spout cover for disengagement of the safety features.

In one aspect of the present invention the temperature sensor mechanism and the associated components are actuated upon the flow of water through the spout cover. This will allow for a long battery life and avoids the need for an always on condition or the need for a separate on switch that could limit the safety effectiveness of the spout cover. Another embodiment of the present invention further includes a water activation alarm indicating unauthorized use of the spout cover and a child-proof water activation alarm deactivation mechanism allowing for authorized use of the spout cover. In this manner parents can be warned of unauthorized or unsupervised bathtub use.

Another aspect of the present safety bathtub spout cover includes a recessed access in the body to allow for access to and operation of a push-pull type shower diverter in the faucet. This allows the shower to be utilized without removing the spout cover. In another aspect according to the present invention the body includes at least one anti-microbial agent.

Further, the features of the safety spout cover may be incorporated directly into a safety spout, wherein the safety bathtub spout comprises a hollow body having a soft exterior having a water outlet for the spout, a temperature sensor mechanism positioned within the water flow within the hollow body, a temperature display coupled to the temperature sensor mechanism for displaying the temperature of the water sensed by temperature sensor, wherein the display is mounted into be visible from any viewing height above the faucet, an audible temperature alarm on the hollow body coupled to the temperature sensor mechanism, wherein the audible temperature alarm is configured to signal unsafe temperature conditions sensed by the temperature sensor mechanism, and a child-proof manual override for disengaging the audible alarm.

These and other advantages of the present invention will be clarified in the description of the preferred embodiments taken together with the attached figures.

DESCRIPTION OF THE PREFERRED EMBODIMENTS

Figure 1:
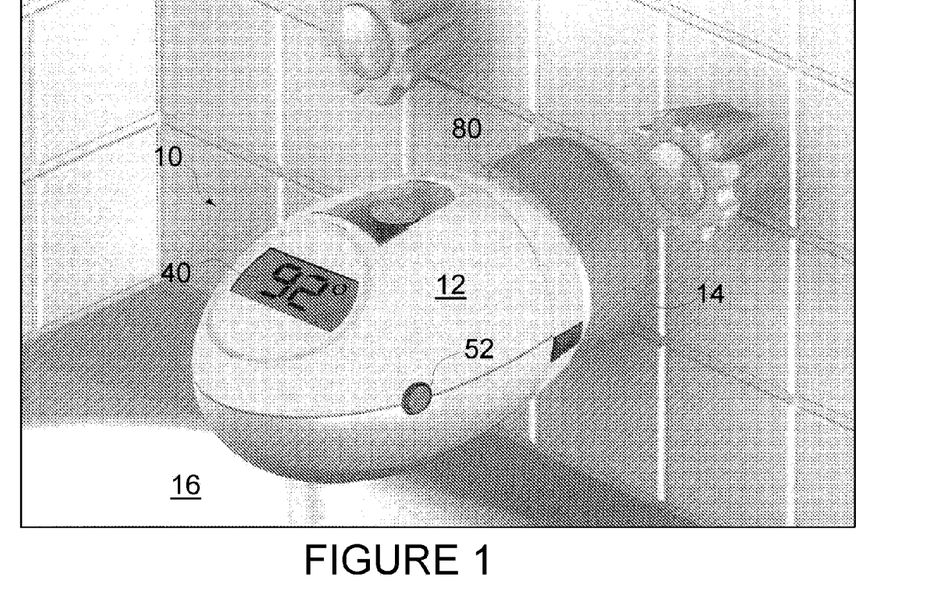
FIG. 1 is a perspective top view of a safety bath spout cover according to one embodiment of the present invention.
Figure 2:
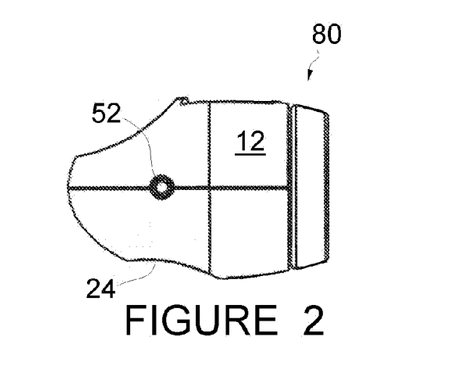
FIG. 2 is a schematic side elevation view of the safety spout cover of FIG. 1.
Figure 3:
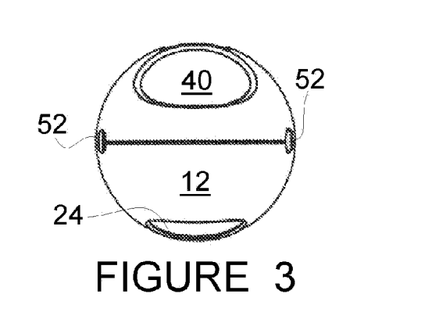
FIG. 3 is a schematic front elevation view of the safety spout cover of FIG. 1.
Figure 4:
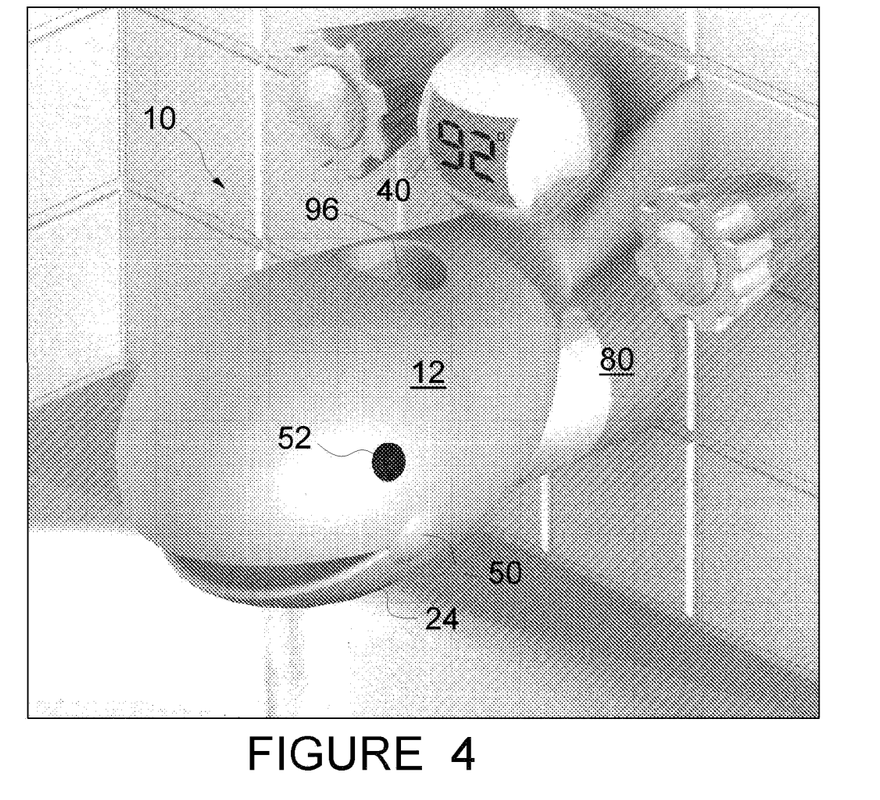
FIG. 4 is a perspective top view of a safety bath spout cover according to a second embodiment of the present invention.
Figure 5:
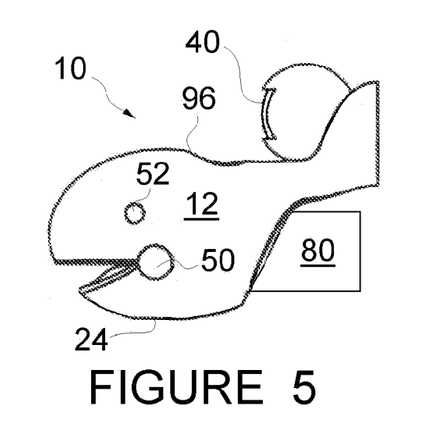
FIG. 5 is a schematic side elevation view of the safety spout cover of FIG. 4.
Figure 6:
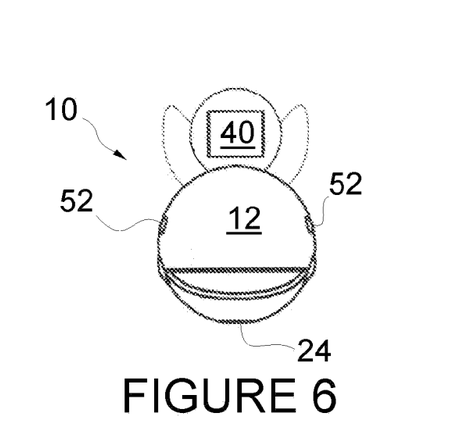
FIG. 6 is a schematic front elevation view of the safety spout cover of FIG. 4.

FIGS. 1-3 illustrates one embodiment of the safety bath spout cover 10 according to the present invention, and FIGS. 4-6 illustrate a distinct second embodiment of the safety bath spout cover 10 according to the present invention. The safety bathtub spout cover 10 includes a hollow body 12 having a soft exterior for impact resistance and user safety. The term hollow merely means that it can receive a spout 14 therein, for example a three sided "L" shaped structure with a channel receiving the spout is a hollow body 12 within the meaning of this application.

As discussed above, the term "soft exterior" within the meaning of this application refers to an impact resistant material that is softer than conventional metal (e.g. steel) or hard plastic, and will be understood by those in the child proofing art. A wide variety of materials can be used to form the soft exterior, including rubber, soft plastics (low durometer plastics), foams and the like. The exterior of the body 12 can have any desired shape, including child friendly animal shapes as shown in FIGS. 4-6. The body 12 is preferably a molded one or two piece assembly, for ease of manufacturing.

The body 12 of the spout cover 12 is adapted to receive the spout or faucet 14 for a bathtub 16 therein. As noted above, the terms "spout" and "faucet" 14 are used herein interchangeably to refer to a bathtub water dispensing plumbing fixture as shown in FIGS. 1 and 4 which is generally extending from the wall essentially at the top surface of the bathtub 16. The terms are not intended to encompass sink faucets or shower heads, which do not present similar safety concerns.

Figure 7:
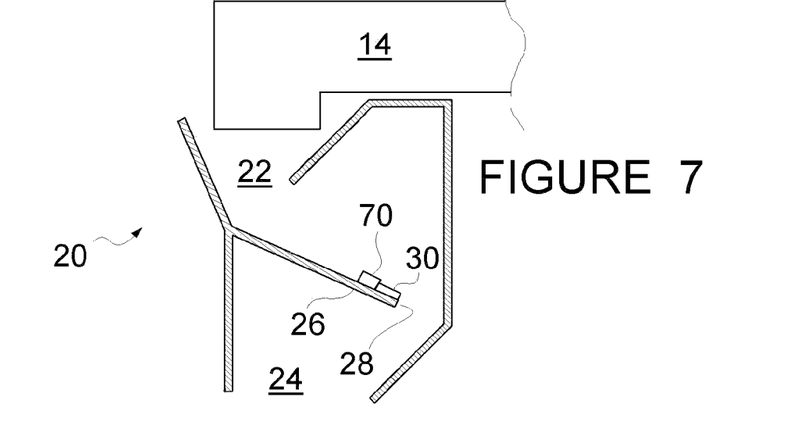
FIG. 7 is a schematic sectional view of a water guide for the spout cover according to one embodiment of the present invention.

The hollow body 12 may include a water guide 20 formed therein. FIG. 7 is a schematic sectional view of a water guide 20 for the spout cover 10 according to one embodiment of the present invention, wherein the hollow body 12 is removed for clarity. The water guide 20 has a water inlet 22 adapted to receive water from an outlet of the faucet 14 and terminating in a water outlet 24 for the spout cover. The water inlet 22 may be a funnel shape to accommodate inaccuracy in placement by the user as well as variation in the spout 14 outlets between distinct models of faucets 14. The water guide 20 may further include an offset 26 in the flow path to provide an area 28 in the water guide 20 where water is certain to be present when water is flowing from the faucet 14.

A temperature sensor mechanism 30 is positioned within the water flow within the hollow body 12. The sensor mechanism 30 is part of a rapid temperature response for the spout cover 10. The term "rapid" refers to the problem that many temperature measuring devices (e.g. mercury thermometers) have a large lag between the actual temperature changing and the reporting of that change. In this case, where the person is adjusting the water temperature with the faucet handles and wanted to adjust according the temperature displayed (as discussed below), such long lags would be unacceptable. A rapid response in accordance with the present invention is a response between change in temperature of the water and ultimate display to the user on the order of a second or less.

The temperature sensor mechanism 30 will be part of a digital system for rapid response and can be formed as one or more standard thermistors. The thermistor(s) of the sensor mechanism 30 may be coupled to an A/D converter which would be coupled to a BCD converter that drives the digital LCD display (described later). This would allow for no microprocessor, however, the A/D converter cost is greater than the microcontroller with the A/D converter in it. Consequently the thermistor(s) of the sensor mechanism 30 may be coupled to a microprocessor which drives the digital display. Appropriate thermistors can be provided by Digikey.

The temperature sensor mechanism 30 may be placed within the water flow through positioning the temperature sensor mechanism 30 within the water guide 20 of the hollow body 12 in a position offset in plan view from the water inlet 22. Specifically the temperature sensor mechanism 30 would be placed at the end of the offset 26 adjacent area 28 as shown in FIG. 7. As the inlet 22 is shaped as a funnel, as shown in FIG. 7, offset in plan view will mean offset from the exit of the funnel forming the inlet 22. Other shapes for the water guide are, of course possible, as FIG. 7 is intended only as a representation. For example, the outlet 24 could coincide with area 28. Although space considerations suggest that the rearward offset (toward the tub wall beneath the faucet 14), the offset 26 could extend laterally or forward of the inlet 22 and the faucet 14. The water guide 20 may be formed in a more compact structure, provided it does not restrict water flow through the spout cover 10. The water guide 20 may be formed integral with the body 12 or as a separate component contained within the body 12. As an alternative, the water guide 20 may simply be a downwardly extending extension arm with the sensor mechanism 30 at the end. With this configuration even if the arm of the water guide extends beyond the flow of water from the spout 14, water will impinge upon the arm and flow down the arm sufficiently to obtain a signal of the water temperature. With this configuration the arm may include a channel to collect and direct sufficient water for sensor 30 to measure where the sensor 30 is not directly in the water flow.

Figures 8, 10:
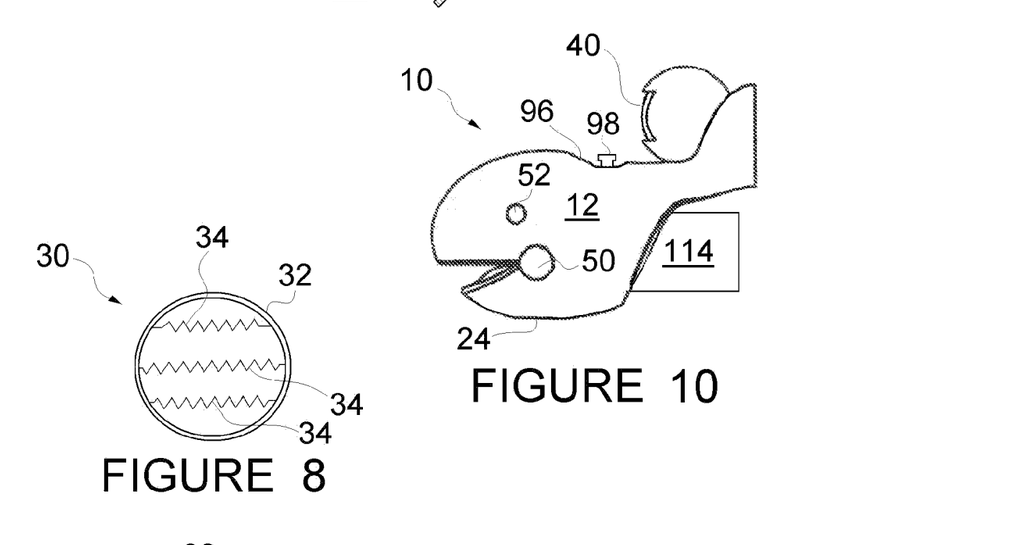
FIG. 8 is a plan view of a sensor array in accordance with one aspect of the present invention.
FIG. 10 is a schematic elevation view of a spout according to one embodiment of the present invention.

Alternatively, the temperature sensor mechanism 30 may be placed within the water flow through forming of the temperature sensor mechanism 30 as shown in FIG. 8 as a holder 32 having an array of sensors 34, wherein the holder 32 is positioned in the outlet 24 of the water guide 20 such that the sensors 34 that extend across the outlet 24. In this arrangement the outlet 24 of the water guide can coincide with the end of the funnel or inlet 22 and the offset 26 and area 28 eliminated. The sensor array assures that one of the sensors 34 is in the water stream, and the controller will need to need to account for which signal is from the sensor in the water stream and therefore indicative of water temperature.

The temperature sensor mechanism 30 is coupled through a controller (not shown) to a digital temperature display 40, such as a backlit LCD numeric display, on the hollow body 12 for displaying the temperature of the water sensed by temperature sensor mechanism 30. The display, such as digital display 40, is preferably an electronic display for consumer confidence reasons. Analog gauges displaying temperature (E.g. a mercury thermometer, or a kitchen meat thermometer) do not imply the accuracy that people expect and want as compared to an electronic display. In safety products, public perception is important for acceptance and adoption, since when not used a safety product offers little safety. Consequently the display for the spout cover 10 should be an electronic display, either alphanumeric or graphical, such as digital temperature display 40.

The digital display 40 is mounted in a direction facing the tub and at an angle of at least five degrees, more preferably at least ten degrees, relative to vertical, whereby the display 40 is visible from any viewing height above the faucet 14. This allows the parent to view the water condition while standing beside the tub 16. This feature can be beneficial for elderly patients who can see the water temperature indication of the display 40 from a standing position prior to stepping into the tub 16. The display 40 may also be a curved display 40 as shown in FIGS. 4-5. The upper portion of the display has an average angle of at least five degrees, more preferably at least ten degrees, relative to vertical, whereby the display 40 is again, visible from any viewing height above the faucet 14. The display preferably includes an alpha-numeric display 42 of the sensed temperature. The alpha-numeric display is preferably a numerical representation with temperature shown in $1/10^{th}$ of a degree increments. Of course, the display can be in Fahrenheit or Celsius, as desired. The system can include a toggle to switch the desired display.

In addition, the display 40 may be moveable to be positioned by the user to place it in the easiest viewable position, however such movement accommodating systems may add considerable to the cost of the spout cover 10. The forward facing, slightly upward angled positioning of the display 40 is preferred from a cost perspective.

Further, the display 40 may include a visual, non-numeric display of the sensed temperature. Specifically, the display 40 includes back lighting of distinct colors, namely a tri-color system. A blue back lighting would indicate a cool or cold water temperature (relative to taking children taking baths), a white or normal back lighting would indicate a normal temperature range for children's bath water, and a red back lighting would indicate a dangerous condition for children's bath water. The back lighting provides an independent non-numeric display for rapidly conveying the sensed condition to the user, effectively acting as a visual alarm. Another modification of the backlighting is to use tricolored numeric displays for the measured temperature number 42 rather than an associated back lighting. However the described backlighting is believed to better convey the information effectively to the user.

The non-numeric aspects of the digital display 40 are intended to work in conjunction with the more conventional numeric display features of the display 40, e.g. the back lighting of the display will back light a numeric display.

The temperature sensor mechanism 30 is coupled through the controller to an audible temperature alarm 50 on the hollow body 12, wherein the audible temperature alarm is configured to audibly signal unsafe temperature conditions sensed by the temperature sensor mechanism 30. As discussed above, the temperature sensor mechanism 30 the audible alarm 50 and the temperature display 40 forms a rapid response system having a lag time of less than 1 second between a measured temperature and the display and or alarm, if appropriate. The audible alarm 50 is a progressive audible temperature alarm with varied levels of activation corresponding to the severity of the scald or high temperature condition sensed by mechanism 30. Essentially as the sensed condition becomes more dangerous the audible alarm increases in volume, pitch, frequency or the like. The specifics of the audible alarm and the variations in possible warning signals to be used are well known to those in the safety art. Any audible warning signal can be used. Further when used in conjunction with the display 40 the audible alarm 50 need only alert the user to the general presence of dangerous conditions while the display will specify the details (e.g. the water temperature is 107 degrees Fahrenheit).

Another aspect of the present invention includes a manual override 52 for disengaging the audible alarm 50, and wherein the actuation of the manual override is child-proof. Specifically the manual override is a pair of buttons 52 on opposed sides of the body 50 that are too far for children to grasp with a single hand. The buttons 52 are pressed simultaneously to actuate the override. This allows adults, e.g. the parents, to take a hot bath that may be at a temperature that would be considered dangerous for children, without hearing the audible alarm 50 which would be distracting and counter productive to the purpose of the relaxing hot bath. The override mechanism 52 must be child-proof so small children could not inadvertently disengage this safety feature. Without the manual override 52 the users would need to take off the spout cover 10 for disengagement of the safety features. Other child safety arrangements for the override could also be used, such as a "depress and twist" motion, which is difficult for children. More elaborate child proofing measures are possible, such as keypads, or pressing in a complex pattern on the buttons 52, but the system should be relatively easy to operate for the adults without greatly increasing the cost or complexity of the cover 10.

In one aspect of the present invention the temperature sensor mechanism 30 and the associated components (e.g. the alarm and display 40) are actuated upon the flow of water through the spout cover 10. This will allow for a long battery life and avoids the need for an always on condition or the need for a separate on switch that could limit the safety effectiveness of the spout cover. The water activation may be through a circuit that is closed in the presence of water, such as through a switch 70 positioned on the offset 26 shown in FIG. 7. Any water activation technique could be utilized, subject to cost considerations.

Another embodiment of the present invention further includes a water activation alarm (which can be the same as audible alarm 50 above) indicating unauthorized use of the spout cover 10 and a child-proof water activation alarm deactivation mechanism allowing for authorized use of the spout cover 10. In this manner parents can be warned of unauthorized or unsupervised bathtub use. The water activation alarm deactivation mechanism can be through buttons 52, if desired. In this arrangement, one use of the buttons would deactivate the water activation alarm, and a second, presumably more complex actuation would deactivate the temperature alarm. Of course, separate child-proof controls may also be provided.

As an alternative to battery power the cover 10 may utilize the flowing water in the spout 14 to generate the power, thereby using a hydroelectric power system.

Figure 9:
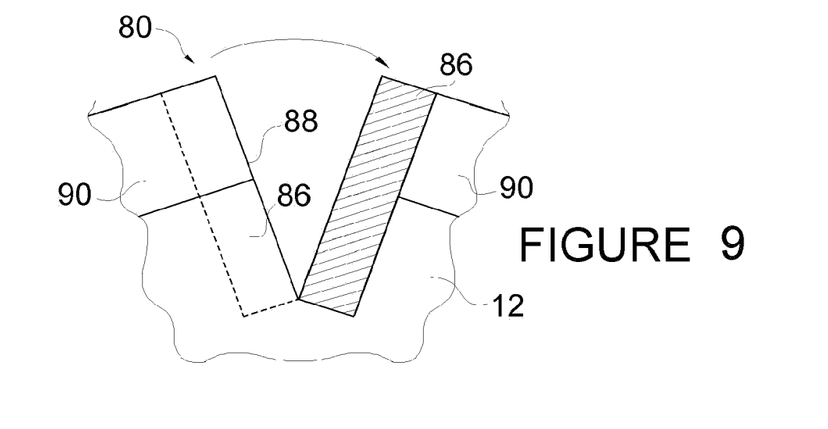
FIG. 9 is a schematic view of a closing mechanism for the spout cover according to one embodiment of the present invention.

The spout cover 10 includes a closing mechanism 80 for attaching the spout cover 10 to the faucet 14 in a temporary, non-marring, non-residue attachment manner. The closing mechanism 80 may be a releasable band 82 and associated closing buckle 84 as shown in FIGS. 1 and 3, such as found in ski boots and roller blades. Alternatively, the closing mechanism 80 may be overlaying hook and loop type fasteners 86 as shown in FIG. 9. The body 12, in either embodiment of the closing mechanism, may include a slit 88 on an end receiving the faucet 14. Specifically, a strip of hook elements would be attached to the body 12 adjacent the slit 88 in an inward, or outward facing direction, and a strip of the loop elements would be adjacent the slit 88 on the other side and facing the opposite direction. Further, in either embodiment of the closing mechanism an interior faucet facing band 90 of a high friction material (e.g. a soft rubber material) is included to assist in forming the attachment mechanism. The high friction material 90 will be clamped against the faucet 14, making the installed spout cover difficult to slide off (without disengaging the closing mechanism 80. The closing mechanism is not limited to the two disclosed embodiments and could be a variety of devices, such as a simple encircling strap and buckle, as common in backpacks.

Another aspect of the present safety bathtub spout cover includes a recessed access 96 in the body 12 to allow for access to and operation of a push-pull type shower diverter 98 in the faucet 14. This allows the shower to be utilized without removing the spout cover 10, while not jeopardizing the impact resistance of the cover 10. In another aspect according to the present invention the body 12 includes at least one anti-microbial agent.

Further, the features of the safety spout cover 10 discussed above may be incorporated directly into a safety spout 100, wherein the safety bathtub spout comprises a hollow body 12 having a soft exterior having a water outlet 24 for the spout 100, a temperature sensor mechanism 30 positioned within the water flow within the hollow body 12, a temperature display 40 coupled to the temperature sensor mechanism 30 for displaying the temperature of the water sensed by temperature sensor mechanism 30, wherein the display 40 is mounted into be visible from any viewing height above the faucet 100, an audible temperature alarm 50 on the hollow body 12 coupled to the temperature sensor mechanism 30, wherein the audible temperature alarm 40 is configured to signal unsafe temperature conditions sensed by the temperature sensor mechanism 30, and a child-proof manual override 52 for disengaging the audible alarm 50. The safety spout 100 does not require a separate water guide, or attachment mechanism to couple the device to a faucet, of course. The safety spout 100 will include a plumbing coupling 114 to attaché the spout 100 to the plumbing from the wall, as is known in the art.

Figure 11:
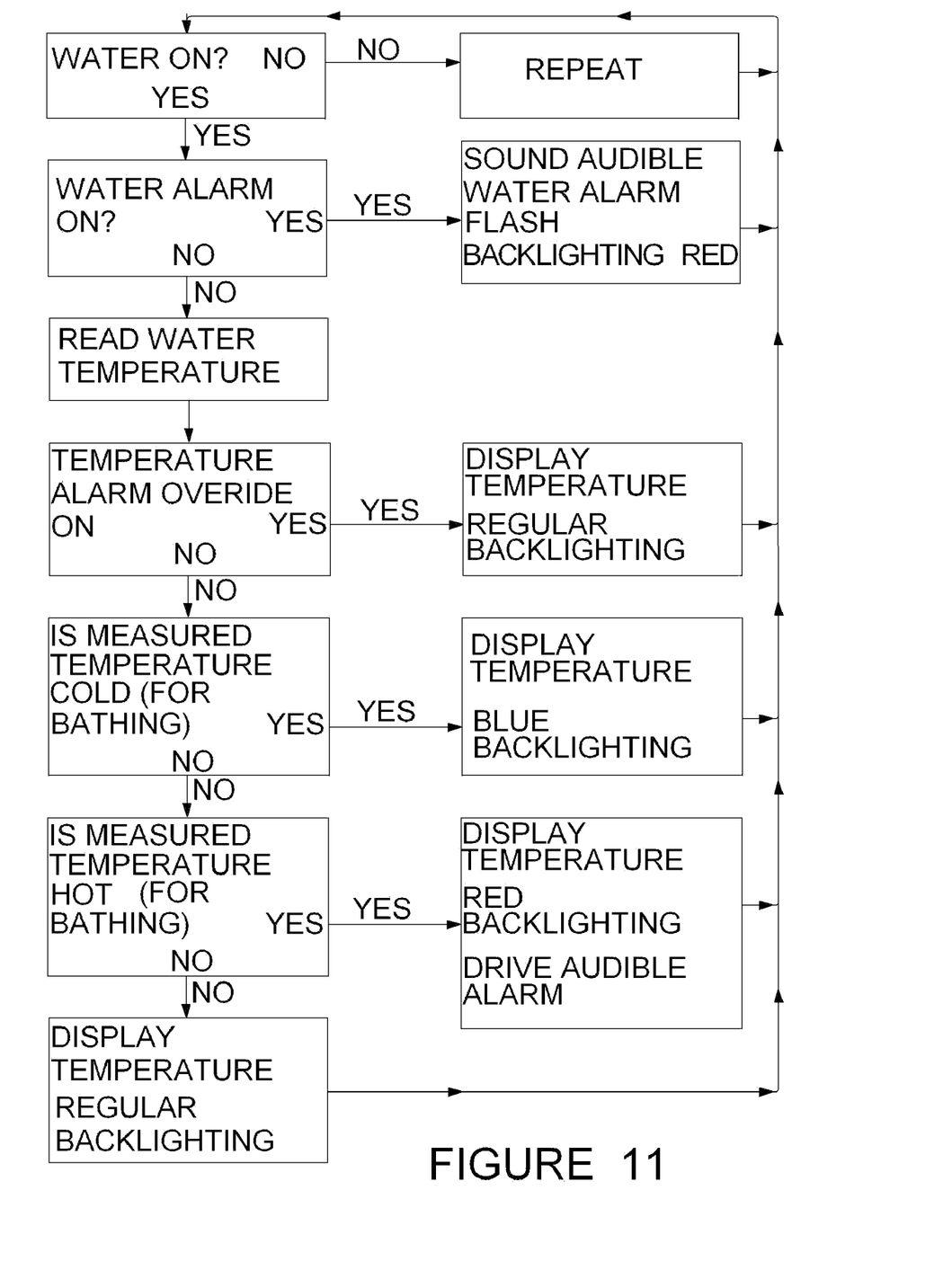
FIG. 11 is a schematic flow chart of the microprocessor operation of the spout cover 10 and the spout 100 in accordance with the present invention.

FIG. 11 is a schematic flow chart of the microprocessor operation of the spout cover 10 and the spout 100 in accordance with the present invention incorporating all of the above features. Obviously a spout cover 10 according to the present invention can omit several of the detailed features of the illustrated embodiments. The first step is to determine if the water is on, such as from the circuit with switch 70. If the water is not on, the control process is done, the components remain dormant until water is sensed. If the water is found to be on the controller checks if the water alarm for the cover 10 is actuated or not. If the water alarm is on, then the controller will activate the audible water alarm (i.e. the same alarm 50 used for temperature warnings). Additionally the red backlighting for the display 40 can be flashed as a visual warning to the user. Preferably the temperature is not displayed numerically to provide the user with a distinction in the operation (e.g. a flashing red light, no temperature reading and audible alarm is the water alarm). A distinct audible alarm can be used as well, to distinguish the sound from the temperature alarm. If the water alarm is not on (e.g. been deactivated by an authorized user) then the water temperature is read and the system checks for a temperature alarm deactivation (e.g. the parent is or could desire to take a very hot bath). If the temperature alarm is deactivated the temperature is displayed on display 40 with no backlighting (hot water will show the hot temperature on the display 40 without the audible alarm or the visual red backlighting). The temperature alarm override will reset to not being overridden every time the water is turned on (e.g. default for the temperature alarm is on). Where the temperature alarm is still on the temperature alarm, display and backlighting will be actuated in accordance with the temperature. Cold bath water temperatures will be displayed with blue backlighting, normal with no backlighting, and hot with red backlighting and the progressive audible alarm. The process is repeated as the temperature changes.

Whereas particular embodiments of this invention have been described above for purposes of illustration, it will be evident to those skilled in the art that numerous variations of the details of the present invention may be made without departing from the invention as defined in the appended claims. For example, as noted the bath spout of the present invention is not limited to children, it can be useful for elderly or others with special needs. The scope of the present invention is intended to be defined by the appended claims and equivalents thereto.

What is claimed is:

1. A bathtub spout covering system comprising:
a faucet having a faucet body extending from a wall over a tub; and
a bathtub spout cover comprising:
A) a hollow body comprising: i) a front portion adapted to engage a forward end of the faucet body; ii) a top portion extending in a rearward direction from the front portion and adapted to engage an upper surface of the faucet body; iii) a left side portion extending in a downward direction from the top member and adapted to engage at least a portion of a left side of the faucet body; iv) a right side portion extending in a downward direction from the top member and adapted to engage at least a portion of a right side of the faucet body; and v) a bottom portion having a water outlet to allow water from the faucet to flow into the tub, the hollow body configured to receive the faucet body therein;
B) a temperature sensor positioned within the water flow from the faucet; and
C) the temperature sensor coupled to an electronic temperature display on the hollow body for displaying the temperature of the water sensed by temperature sensor and a temperature alarm on the hollow body comprising at least one of an audible alarm and a visual alarm, wherein the temperature alarm is configured to signal unsafe water temperature conditions sensed by the temperature sensor,
wherein the display is mounted in a direction facing the tub and at an angle of at least five degrees relative to vertical, whereby the display is visible from any viewing height above the faucet, and
the display includes a light source for backlighting of the display, the light source forms at least three distinct backlighting colors, and the displayed backlighting color is responsive to at least the tap water temperature as measured by the temperature sensor,
wherein a first distinct backlighting color is indicative of water temperature that is below a desired range of water temperatures, a second distinct backlighting color is indicative of water temperature that is within a desired range of water temperatures, and a third distinct backlighting color is indicative of water temperature that is above a desired range of water temperatures.

2. The bathtub spout cover according to claim 1 wherein the temperature sensor is coupled to the temperature display and wherein the display is a digital display and the sensor and display have a thermal time constant of less than 5 seconds between a measured temperature and the display of the temperature.

3. The bathtub spout cover according to claim 1 further including a closing mechanism for attaching the spout cover to the faucet in a temporary, non-marring, non-residue attachment manner.

4. The bathtub spout cover according to claim 1 wherein the temperature sensor is coupled to the temperature alarm on the hollow body having the audible alarm, wherein the audible alarm is a progressive audible temperature alarm with varied levels of activation corresponding to the severity of the water temperature condition sensed.

5. The bathtub spout cover according to claim 1 wherein the body includes at least one anti-microbial agent.

6. The bathtub spout cover according to claim 1 wherein the temperature sensor is coupled to the temperature alarm on the hollow body having the audible alarm, and further including a manual override for disengaging the audible alarm, and wherein the actuation of the manual override is child-proof.

7. The bathtub spout cover according to claim 1 wherein the temperature sensor is actuated upon the flow of water through the spout cover.

8. The bathtub spout cover according to claim 1 further comprising a water activation alarm indicating unauthorized use of the spout cover and a water activation alarm deactivation mechanism allowing for authorized use of the spout cover.

9. The bathtub spout cover according to claim 1 further including a recessed access in the top portion of the body to allow for access to and operation of a push-pull type shower diverter in the faucet.

10. A safety bathtub spout cover comprising:
A) a hollow body having a soft exterior and adapted to receive a faucet having a faucet body extending from a wall over a tub, the hollow body having a water guide for the spout cover, the water guide comprising: a funnel shaped water inlet; a water outlet; and an offset portion provided between the water inlet and the water outlet;
B) a temperature sensor mechanism positioned on the offset portion of the water guide within the water flow from the faucet to measure a tap water temperature; and
C) a temperature alarm on the hollow body coupled to the temperature sensor and comprising at least an audible alarm, wherein the audible alarm is responsive at least to the tap water temperature as measured by the temperature sensor and having distinct audible alerts that are indicative of distinct tap water temperatures as measured by the temperature sensor, wherein at least one audible alert is associated with water temperature that is outside of a desired water temperature range and wherein the audible alarm for the audible alert that is associated with water temperature that is outside of a desired water temperature range is a progressive audible temperature alarm with varied levels of alarm activation corresponding to a severity of the tap water temperature measured by the temperature sensor,
wherein the varied levels of alarm activation progressively increase in at least one of the following: volume, pitch, frequency, or any combination thereof as the tap water temperature measured by the temperature sensor progressively increases above the desired range.

11. The safety bathtub spout cover according to claim 10 wherein the display is mounted in a direction facing the tub and at an angle of at least five degrees relative to vertical, whereby the display is visible from any viewing height above the faucet.

12. The safety bathtub spout cover according to claim 10 further comprising a water activation alarm indicating unauthorized use of the spout cover and a water activation alarm deactivation mechanism allowing for authorized use of the spout cover.

13. The safety bathtub spout cover according to claim 10 further including a recessed access in the body to allow for access to and operation of a push-pull type shower diverter in the faucet.

14. The safety bathtub spout cover according to claim 10 wherein the temperature alarm further comprises a manual override for disengaging the audible alarm, and wherein the actuation of the manual override is child-proof.

15. The safety bathtub spout cover according to claim 10 further including a closing mechanism for attaching the spout cover to the faucet in a temporary, non-marring, non-residue attachment manner.

16. The safety bathtub spout cover according to claim 10 wherein the temperature sensor mechanism and the associated components are actuated upon the flow of water through the spout cover.

17. A safety bathtub spout comprising:
A) a hollow body having a soft exterior positioned over a spout, the spout having a spout body extending from a wall over a tub, the hollow body comprising: i) a front portion adapted to engage a forward end of the spout body; ii) a top portion extending in a rearward direction from the front portion and adapted to engage an upper surface of the spout body; iii) a left side portion extending in a downward direction from the top member and adapted to engage at least a portion of a left side of the spout body; iv) a right side portion extending in a downward direction from the top member and adapted to engage at least a portion of a right side of the spout body; and v) a bottom portion having a water guide to allow water from the spout to flow into the tub, the hollow body configured to receive the spout body therein and the water guide comprising: a funnel shaped water inlet a water outlet and an offset portion provided between the water inlet and the water outlet;
B) a temperature sensor mechanism positioned on the offset portion of the water guide within the water flow; and
C) an electronic temperature display coupled to the temperature sensor mechanism for displaying the temperature of the water sensed by temperature sensor, wherein the display is mounted in a direction facing the tub and at an angle of at least five degrees relative to vertical, whereby the display is visible from any viewing height above the faucet.

* * * * *